United States Patent
Tsukuma (10) Patent No.: US 9,249,057 B2
(45) Date of Patent: Feb. 2, 2016

(54) RED LIGHT TRANSMITTING ZIRCONIA SINTERED BODY, METHOD FOR PRODUCING THE SAME, MEMBER COMPRISING THE SINTERED BODY, AND JEWELRY GOODS AND EXTERIOR COMPONENT USING THE MEMBER

(75) Inventor: Koji Tsukuma, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 351 days.

(21) Appl. No.: 13/583,370

(22) PCT Filed: Mar. 4, 2011

(86) PCT No.: PCT/JP2011/055073
§ 371 (c)(1),
(2), (4) Date: Sep. 7, 2012

(87) PCT Pub. No.: WO2011/111624
PCT Pub. Date: Sep. 15, 2011

(65) Prior Publication Data
US 2013/0037763 A1    Feb. 14, 2013

(30) Foreign Application Priority Data
Mar. 9, 2010   (JP) ................................. 2010-051627

(51) Int. Cl.
*G02B 5/20* (2006.01)
*C04B 35/486* (2006.01)
*C04B 35/645* (2006.01)
*B82Y 30/00* (2011.01)
(Continued)

(52) U.S. Cl.
CPC .............. *C04B 35/486* (2013.01); *B82Y 30/00* (2013.01); *C04B 35/6455* (2013.01); *C04B 2235/3224* (2013.01); *C04B 2235/3225* (2013.01); *C04B 2235/3229* (2013.01); *C04B 2235/3244* (2013.01); *C04B 2235/3246* (2013.01); *C04B 2235/3275* (2013.01); *C04B 2235/5409* (2013.01); *C04B 2235/549* (2013.01);
(Continued)

(58) Field of Classification Search
USPC ........... 252/584, 586; 264/604, 605; 423/608; 501/103, 134, 186
See application file for complete search history.

(56) References Cited

U.S. PATENT DOCUMENTS

2007/0197368 A1*  8/2007  Tsukuma et al. ............. 501/103
2012/0094823 A1   4/2012  Watanabe et al.

FOREIGN PATENT DOCUMENTS

| | | |
|---|---|---|
| DE | 102009030951 | 1/2010 |
| JP | 62-83366 | 4/1987 |

(Continued)

OTHER PUBLICATIONS

Search Report from International Application No. PCT/JP2011/055073, mail date is May 17, 2011.
(Continued)

*Primary Examiner* — Bijan Ahvazi
(74) *Attorney, Agent, or Firm* — Greenblum & Bernstein, P.L.C.

(57) ABSTRACT

An object of the present invention is to provide a colored translucent zirconia sintered body having red color and high translucency. The present invention relates to a zirconia sintered body, characterized by containing 6 to 30 mo % of yttria and 0.1 to 5 mol % of cerium oxide in terms of $CeO_2$, the cerium oxide containing an oxide of trivalent cerium. The zirconia sintered body of the present invention has, in addition of high hardness, diamond luster based on high refractive index inherent in zirconia, deep red color and transparency.

16 Claims, 3 Drawing Sheets

(51) Int. Cl.
  *B28B 1/00* (2006.01)
  *B28B 3/00* (2006.01)
  *B28B 5/00* (2006.01)
  *C04B 33/32* (2006.01)
  *C04B 33/36* (2006.01)
  *C04B 35/64* (2006.01)
  *C04B 35/48* (2006.01)
  *C04B 35/49* (2006.01)

(52) U.S. Cl.
  CPC ... *C04B2235/5454* (2013.01); *C04B 2235/604* (2013.01); *C04B 2235/6562* (2013.01); *C04B 2235/661* (2013.01); *C04B 2235/662* (2013.01); *C04B 2235/762* (2013.01); *C04B 2235/77* (2013.01); *C04B 2235/786* (2013.01); *C04B 2235/94* (2013.01); *C04B 2235/963* (2013.01); *C04B 2235/9653* (2013.01); *C04B 2235/9661* (2013.01)

(56) References Cited

FOREIGN PATENT DOCUMENTS

| JP | 62-091467 | | 4/1987 | |
| --- | --- | --- | --- | --- |
| JP | 62-202859 | | 9/1987 | |
| JP | 01-126267 | * | 5/1989 | |
| JP | 2-92867 | | 4/1990 | |
| JP | 6-191939 | | 7/1994 | |
| JP | 7-118064 | | 5/1995 | |
| JP | 7-110785 | | 11/1995 | |
| JP | 07110785 B | * | 11/1995 | ............. C04B 35/48 |
| JP | 2007-246384 | | 9/2007 | |
| JP | EP2243756 A1 | * | 10/2010 | ............. C04B 35/48 |
| JP | 5125065 | | 1/2013 | |
| KR | 1020070099769 | | 10/2007 | |
| WO | 2009/096478 | | 8/2009 | |

OTHER PUBLICATIONS

Japan Office action in JP2011-048858, dated Sep. 30, 2014 along with an English translation thereof.

China Office action in CN 201180013290.8, dated Jun. 24, 2014 along with an english translation thereof.

Search report from E.P.O. in EPA 11753283.8, mail date is Oct. 17, 2013.

Office Action in Chinese Appl 201180013290.8, mail date is Oct. 8, 2013 along with English language translation thereof.

* cited by examiner

RED LIGHT TRANSMITTING ZIRCONIA SINTERED BODY, METHOD FOR PRODUCING THE SAME, MEMBER COMPRISING THE SINTERED BODY, AND JEWELRY GOODS AND EXTERIOR COMPONENT USING THE MEMBER

TECHNICAL FIELD

The present invention relates to a colored translucent zirconia sintered body that not only has red color but has high translucency, a method for producing the same, a member comprising the sintered body, and jewelry goods and exterior component using the member.

BACKGROUND ART

Zirconia sintered body is an excellent ceramic material having high strength and pearly luster. Furthermore, further luxurious feel can be given by giving translucency. Recently, uses as not only the conventional structural member use but a jewelry member and an exterior member of electronic instruments are expanded.

Conventionally, in a zirconia sintered body having increased translucency (Patent Document 1), its color tone was colorless or pale yellow. With expansion of uses of a transparent zirconia sintered body, further colorfully colored sintered body, that is, a colored translucent zirconia sintered body, is being required, while maintaining translucency of the zirconia sintered body. Of such colored translucent zirconia sintered bodies, a colored translucent zirconia sintered body having red color is strongly demanded as a translucent zirconia sintered body having clear coloration that gives particularly rich decorativeness.

Colored translucent zirconia sintered body is heretofore almost not studied. For example, a colored translucent zirconia sintered body having slightly purple color or pink color is merely reported (Patent Document 2). Those sintered bodies have used neodymium oxide or erbium oxide as a major colorant.

However, a translucent zirconia sintered body having high translucency and clear red color has not yet heretofore been obtained.

PRIOR ART REFERENCES

Patent Documents

Patent Document 1: JP-A-62-091467
Patent Document 2: JP-A-2007-246384

SUMMARY OF THE INVENTION

Problems that the Invention is to Solve

The present invention provides a colored translucent zirconia sintered body having not only red color but high translucency.

Means for Solving the Problems

The present inventors have earnestly studied on a colored translucent zirconia sintered body having red color. As a result, they have found that a red-colored translucent zirconia sintered body is obtained without deteriorating translucency by containing cerium oxide as a colorant in a translucent zirconia sintered body containing yttria ($Y_2O_3$).

That is, the present invention is a zirconia sintered body characterized by containing 6 to 30 mol % of yttria, and 0.1 to 5 mol % of cerium oxide in terms of $CeO_2$, the cerium oxide containing an oxide of trivalent cerium.

Conventionally, the trivalent cerium has too large ion radius, and therefore has been unstable in a zirconium crystal structure. For this reason, cerium in the zirconia crystal structure was present in only a tetravalent state. However, the present inventors have found that a zirconia sintered body colors in red without deteriorating translucency by that cerium is stabilized in a zirconia crystal structure in a trivalent state and is present therein, and have reached to complete the present invention.

That is, the gist of the present invention resides in the following (1) to (11).

(1) A zirconia sintered body characterized by containing 6 to 30 mol % of yttria, and 0.1 to 5 mol % of cerium oxide in terms of $CeO_2$, the cerium oxide containing an oxide of trivalent cerium.
(2) Preferably, the zirconia sintered body described in (1) above, characterized in that a crystal phase is a cubic fluorite type structure.
(3) Preferably, the zirconia sintered body described in (1) or (2) above, characterized in that in a sample having a thickness of 1 mm, a maximum value of in-line transmission to visible light having a wavelength of 400 to 500 nm is 3% or less, and a maximum value of in-line transmission to visible light having a wavelength of 600 to 800 nm is 40% or more.
(4) Preferably, the zirconia sintered body described in any one of (1) to (3) above, characterized in that brightness $L^*$, and hues $a^*$ and $b^*$ are $20 \leq L^* \leq 50$, $40 \leq a^* \leq 60$ and $30 \leq b^* \leq 70$.
(5) A method for producing a zirconia sintered body, characterized by molding a zirconia powder containing 6 to 30 mol % of yttria and 0.1 to 5 mol % of cerium oxide in terms of $CeO_2$, subjecting the resulting molding to primary sintering, hot isostatic press (HIP) treatment and annealing, and forming trivalent cerium in the sintered body.
(6) Preferably, the production method described in (5) above, characterized in that the HIP treatment is conducted by placing the primary sintered body in a gas-permeable container.
(7) Preferably, the method for producing a zirconia sintered body described in (5) or (6) above, characterized in that the annealing is conducted at 800° C. or higher and 1,000° C. or lower.
(8) Preferably, the production method described in any one of (5) to (7) above, characterized in that the primary sintered body to be subjected to the HIP treatment has an average grain size of 5 µm or less.
(9) A member comprising the zirconia sintered body described in any one of (1) to (4) above.
(10) Jewelry goods characterized by using the member described in (9) above.
(11) An exterior component characterized by using the member described in (9) above.

Advantage of the Invention

A zirconia sintered body having deep red color and transparency in addition to diamond luster based on high refractive index inherent in zirconia can be obtained by the present invention.

MODE FOR CARRYING OUT THE INVENTION

The zirconia sintered body of the present invention is described below.

The zirconia sintered body of the present invention contains yttria in an amount of 6 to 30 mol %, preferably 7 to 30 mol %, and more preferably 8 to 15 mol %. The yttria is a stabilizer of zirconia. Crystal structure of the zirconia sintered body is stabilized by containing yttria. Furthermore, crystal phase of the zirconia sintered body can be constituted of only a cubic crystal (fluorite type structure) by that the yttria content falls within the range. Where the yttria content is less than 6 mol %, tetragonal crystal is easily present other than cubic crystal, and translucency is easy to be decreased. When the yttria content is 7 mol % or more, tetragonal crystal becomes further difficult to be formed, and the crystal phase can be constituted of only cubic crystal.

The yttria content can be obtained by $Y_2O_3/(ZrO_2+Y_2O_3)$.

The zirconia sintered body of the present invention contains 0.1 to 5 mol % of cerium oxide in terms of $CeO_2$. The content of cerium oxide is preferably 0.5 to 2 mol %, more preferably 0.5 to 1 mol %, and further preferably 0.5 to 0.75 mol %. The cerium oxide functions as a colorant for generating red color. The zirconium sintered body can generate red color having excellent color tone by containing cerium oxide in the above range. On the other hand, where the cerium oxide content is less than 0.1 mol %, red coloration of the present invention is not obtained. Where the cerium oxide content exceeds 5 mol %, translucency of the zirconia sintered body is decreased by precipitation of cerium oxide.

The cerium oxide content is obtained by $CeO_2/(ZrO_2+Y_2O_3+CeO_2)$.

In the zirconia sintered body of the present invention, the cerium oxide is required to contain trivalent cerium. The trivalent cerium is contained in the zirconia sintered body as an oxide of trivalent cerium. The zirconia sintered body generates particularly clear red color by containing trivalent cerium.

The zirconia sintered body generates clearer red color with increasing the trivalent cerium. For this reason, the trivalent cerium is preferably 50% or more, more preferably 80% or more, further preferably 90% or more, of cerium in the cerium oxide. It is more preferred as the proportion of the trivalent cerium approaches 100%.

The proportion (%) of trivalent cerium used herein means mole fraction (mol %) occupied by the trivalent cerium to cerium oxide contained in the zirconia sintered body. The proportion of the trivalent cerium can be obtained from $CeO_{1.5}/(CeO_{1.5}+CeO_2)$. For this reason, the oxide of trivalent cerium has the same proportion (mol %).

Thus, the colored translucent zirconia sintered body of the present invention differs from a colored translucent zirconia sintered body that utilizes coloring generated by a colorant (cerium oxide ($CeO_2$)) itself present, that is, coloring generated by tetravalent cerium.

The zirconia sintered body of the present invention is preferably that crystal phase is a cubic fluorite type structure. Cubic crystal does not have optical anisotropy. Therefore, particularly high transparency is obtained by that individual crystals of polycrystalline body that the zirconia sintered body has are cubic crystals.

The zirconia sintered body of the present invention has a cubic fluorite type crystal structure. Furthermore, the zirconia sintered body of the present invention is polycrystalline body comprising many crystal particles, and differs from a zirconia sintered body of single crystal.

The zirconia sintered body of the present invention may contain a stabilizer other than yttria, such as lanthanoid series rare earth oxide, Ca, Mg or its oxide, in a range that translucency is not lowered and color tone is not impaired.

The zirconia sintered body of the present invention may contain a colorant for controlling color tone of red color. Examples of the colorant for controlling color tone of red color can include lanthanoid series rare earth oxide such as neodymium oxide, and transition metal oxide such as cobalt oxide. The colorant for controlling color tone of red color is preferably neodymium oxide, cobalt oxide or both.

The total content of those stabilizers and the colorants for controlling color tone of red color is preferably 2 mol % or less, more preferably 1 mol % or less, further preferably 0.1 mol % or less, and further more preferably 0.05 mol % or less (500 ppm or less). When the content is 2 mol % or less, those compounds do not precipitate and can exist in the form of solid solution in the zirconia sintered body.

The contents of the stabilizer other than yttria and the colorant for controlling color tone of red color are the proportion to the zirconia sintered body and is obtained by $X/(ZrO_2+Y_2O_3+CeO_2+X)$ (X is a stabilizer other than yttria and a colorant for controlling color tone of red color).

The zirconia sintered body of the present invention is that in a sample having a thickness of 1 mm, a maximum value of in-line transmission to visible light having a wavelength of 600 to 800 nm is preferably 40% or more, more preferably 50% or more, and further preferably 60% or more. Where the maximum value of in-line transmission to visible light having a wavelength of 600 to 800 nm is less than 40%, translucency is low, leading to poor sensuousness.

Thus, the zirconia sintered body of the present invention has high maximum value of in-line transmission to visible light having a wavelength of 600 to 800 nm. Therefore, the zirconia sintered body of the present invention is a translucent zirconia sintered body having high transparency equivalent to that of a transparent zirconia sintered body.

On the other hand, the zirconia sintered body of the present invention is that in a sample having a thickness of 1 mm, a maximum value of in-line transmission to visible light having a wavelength of 400 to 500 nm is preferably 3% or less, and more preferably 1% or less. Visible light having a wavelength of 400 to 500 nm is absorbed based on red color. As a result, the zirconia sintered body of the present invention is that the in-line transmission of visible light having a wavelength of 400 to 500 nm is substantially 0%. Considering variation of measurement, the in-line transmission is preferably 3% or less, more preferably 1% or less, and further preferably 0.5% or less.

The translucent zirconia sintered body having red color of the present invention is easy to transmit visible light having a wavelength of 600 to 800 nm. However, visible light having a wavelength of 400 to 500 nm is difficult to be transmitted due to absorption based on red color. The conventional colored translucent zirconia sintered bodies having pin or purple color absorb visible light of about 400 to 500 nm. However, absorption of those sintered bodies differs from the absorption of the zirconia sintered body of the present invention. The colored translucent zirconia sintered body having pink or purple color in which a maximum value of in-line transmission to visible light having a wavelength of 600 to 800 nm is 40% or more is that the in-line transmission at 400 to 500 nm is 5% or more.

Color tone of the colored zirconia sintered body is defined by brightness L*, and hues a* and b*. When the brightness L* value is increased, the hue becomes bright, and on the other hand, when the L* value is decreased, the hue becomes dark. The hue a* shows color tone of from red to green, red color tone becomes strong with increasing a* value, and green color tone becomes strong with decreasing the value. On the other hand, the b* value shows color tone of from yellow to blue, yellow color tone becomes strong with increasing b* value, and blue color tone becomes strong with decreasing the b* value.

The zirconia sintered body of the present invention is a zirconia sintered body having translucency, that is, a translucent zirconia sintered body. Therefore, color tone of the zirconia sintered body of the present invention varies depending on translucency. For example, when the in-line transmission is increased, the brightness L* and hues a* and b* all are increased. On the other hand, when the in-line transmission is decreased, the brightness L* and hues a* and b* all are decreased.

$20 \leq L^* \leq 50$, $40 \leq a^* \leq 60$ and $30 \leq b^* \leq 70$ are exemplified as the color tone that can be achieved by the range of translucency that the zirconia sintered body of the present invention has. As preferred color tone, $30 \leq L^* \leq 45$, $50 \leq a^* \leq 60$ and $50 \leq b^* \leq 70$ can be exemplified as particularly bright clear red color, and $20 \leq L^* \leq 30$, $40 \leq a^* \leq 50$ and $30 \leq b^* \leq 50$ can be exemplified as particularly deep red color.

Average grain size of crystal particles in the zirconia sintered body of the present invention is preferably 10 μm or more and 50 μm or less. Where the average grain size exceeds 50 μm, bending strength of the zirconia sintered body tends to be decreased.

A method for producing a zirconia sintered body of the present invention is described below.

The zirconia sintered body of the present invention can be produced by molding a zirconia powder containing 6 to 30 mol % of yttria and 0.1 to 5 mol % of cerium oxide in terms of $CeO_2$, subjecting the resulting molding to primary sintering and hot isostatic press (HIP) treatment, and then annealing to form trivalent cerium in the sintered body.

The method of the present invention molds a raw material powder containing zirconia, yttrium and cerium oxide.

It is preferred that the zirconia powder used in the raw material is easily sinterable. For example, a powder comprising fine particles having a specific surface area of 5 to 20 m²/g and crystallite diameter of 10 to 100 nm is preferably used. Furthermore, a powder having 6 to 30 mol % of yttria to zirconia, previously dissolved therein in the form of solid solution is more preferably used. An easily sinterable powder having 8 mol % of yttria or 10 mol % of yttria, produced by a hydrolysis method, dissolved therein in the form of solid solution can be used as such a powder.

The method for adding cerium oxide is that cerium oxide is mixed with the zirconia powder so as to achieve the composition range of the present invention, and the addition method is not limited. In this case, a cerium oxide powder having a purity of 99.9% and an average grain size of 2 to 3 μm is preferably used, and a powder comprising fine particles having an average grain size of 1 μm is more preferably used.

The method for mixing the powder is not limited so long as those components are uniformly mixed, and can use ordinary wet mixing methods such as a ball mill or a mixing mill.

The molding of the raw material powder is not particularly limited so long as the raw material powder can be molded into a desired shape, and can be conducted by ordinary ceramics molding methods such as mold press, cold isostatic pressure press, slip casting or injection molding.

The molding obtained is then sintered in the air under ordinary pressure to obtain a primary sintered body. The primary sintering can be conducted in the air using an ordinary sintering furnace.

The primary sintering temperature is preferably 1,250° C. or higher and 1,400° C. or lower. Where the temperature is lower than 1,250° C., a density tends to be decreased such that a relative density of the primary sintered body obtained is 95% or less. As a result, the density of the zirconia sintered body after the HIP treatment is difficult to be increased. Furthermore, where the temperature exceeds 1,400° C., a crystal grain size of the primary sintered body becomes too large, and translucency of the zirconia sintered body after the HIP treatment tends to be decreased.

The average crystal grain size of the primary sintered body is preferably 5 μm or less, more preferably 2 μm or less, and further preferably 1.5 μm or less. Where the average crystal grain size exceeds 5 μm, density of the zirconia sintered body after the HIP treatment tends to be decreased.

In the method of the present invention, the primary sintered body is subjected to HIP treatment.

In the HIP treatment, tetravalent cerium in the primary sintered body is reduced to form trivalent cerium. The sintered body generates red color by containing trivalent cerium.

The HIP treatment is preferably conducted by placing the primary sintered body in a gas-permeable container. Formation of the trivalent cerium is accelerated by this. The gas-permeable container is not particularly limited so long as the container is not a closed container, and examples thereof include open containers such as a container with a lid, having gas holes, and a container without a lid.

The reason that formation of trivalent cerium is accelerated by using such a container is unclear, but it is considered as follows. That is, when cerium is reduced during the HIP treatment, the reaction of the following formula (1) occurs, and oxygen is released.

$$CeO_2 \rightarrow \tfrac{1}{2}Ce_2O_3 + \tfrac{1}{4}O_2 \uparrow \qquad (1)$$

When oxygen formed by the above reaction retains in a closed container, the primary sintered body is oxidized. Formation of trivalent cerium is suppressed by this. By using a gas-permeable container, oxygen present near the primary sintered body is removed, and formation of trivalent cerium is accelerated.

The HIP treatment is preferably conducted in strongly reducing atmosphere, and a non-oxidizing gas such as argon or nitrogen is preferably used as a pressure medium. Furthermore, an apparatus in which a heating source and a heat-insulating material are made of graphite is preferably used.

The HIP treatment temperature is preferably 1,400° C. or higher and 1,800° C. or lower, and more preferably 1,500° C. or higher and 1,700° C. or lower. Where the temperature is lower than 1,400° C., trivalent cerium is difficult to be formed. On the other hand, where the HIP treatment temperature exceeds 1,800° C., growth of crystal particles becomes remarkable, and as a result, strength of the zirconia sintered body obtained tends to be decreased. With increasing the HIP treatment temperature, the brightness L* value and hues a* value and b* value of the zirconia sintered body obtained are increased, and the zirconia sintered body easily generates clear red color.

The HIP treatment pressure is preferably 50 MPa or more and 200 MPa or less. Where the pressure is less than 50 MPa, pressurization effect is not obtained, and density of the zirconia sintered body is difficult to be improved. On the other hand, when the pressure is 200 MPa, densification of the zirconia sintered body tends to be accelerated.

In the production method of the present invention, the HIP treated body after the HIP treatment is annealed (heat-treated in oxidizing atmosphere). By annealing, black tinge is removed from the zirconia sintered body, and translucency is improved. The annealing is preferably conducted in an oxidizing atmosphere such as the ordinary atmosphere or a gas atmosphere containing oxygen. Conducting in the ordinary atmosphere is most simple and is therefore more preferred.

The annealing temperature is preferably 800° C. or higher and 1,000° C. or lower. Where the annealing is conducted at a temperature exceeding 1,000° C., trivalent cerium formed by the HIP treatment is reoxidized to convert into tetravalent cerium. As a result, the sintered body tends to change from red color to pale yellow color. On the other hand, where the annealing temperature is lower than 800° C., black tinge is not removed from the sintered body, and translucency is decreased. The holding time of the annealing is preferably 1 hour or more and 5 hours or less.

EXAMPLES

The present invention is specifically described below by reference to Examples, but the invention is not construed as being limited to the Examples.

Measurement methods of the sintered body and the powder of the present invention are described below.
(Measurement of Color Tone)

Color tone was measured using a color-analyzer (Color Analyzer TC-1800MK-II, manufactured by Tokyo Denshoku Co., Ltd.) under the condition of D65 light source and 10° view angle according to JIS Z8722.
(In-Line Transmission)

Transmission was measured based on JIS K7105 "Test Method of Optical Characteristics of Plastics" and JIS K7361-1 "Test Method of Total forward Transmission of Plastic and Transparent Material". Measurement sample used was a sample obtained by processing a sintered body so as to have a thickness of 1 mm, and mirror-polishing both surfaces to surface roughness=0.02 μm or less. Double beam system spectrophotometer (V-650 Model, manufactured by JASCO Corporation) was used for the measurement, light emitted from a light source (deuterium lamp and halogen lamp) is passed through and scattered in the sample, and total forward transmission amount and diffuse transmission amount were measured using an integrating sphere. The in-line transmission was derived from the formula (2). Measurement wavelength region was a region of 200 to 800 nm.

$$Ti = Tt - Td \quad (2)$$

Tt: Total forward transmission (%)
Td: Diffuse transmission (%)
Ti: In-line transmission (%)
(Measurement of Fluorescence Spectrum)

Fluorescence spectrum of a sintered body was measured and the presence or absence of trivalent cerium in the sintered body was confirmed. For the measurement, FP-6500 apparatus manufactured by JASCO Corporation was used, a xenon lamp (248 nm) was used as an excitation light source, and emission of light having a wavelength of 300 to 700 nm was measured by a reflection method. The measurement sample used was the sample used in the measurement of in-line transmission. Trivalent cerium was confirmed by the presence of peak near 570 to 600 nm.

Examples 1 to 6

Preparation of Raw Material Powder

Zirconia powder and cerium oxide power were weighed in given amounts, and those powders were mixed with a ball mill using zirconia-made balls having a diameter of 10 mm in an ethanol solvent for 72 hours, followed by drying. Thus, raw material powders having different cerium amount were prepared.

8 mol % yttria-containing zirconia powder produced by a hydrolysis method (manufactured by Tosoh Corporation, TZ-8Y, specific surface area: 13 $m^2/g$, crystallite diameter: 40 nm) was used as the zirconia powder, and a reagent having a purity of 99.9% was used as the cerium oxide powder.

Primary Sintering

Each raw material powder was molded under a pressure of 50 MPa by metallic mold pressing, and the resulting molding was treated under a pressure of 200 MPa using a cold isostatic press apparatus. Thus, a columnar molding having a diameter of 20 mm and a thickness of 3 mm was obtained.

The moldings obtained were sintered in the air at a sintering temperature of 1,350° C. for a sintering time of 2 hours in a temperature rising rate of 100° C./h, and then spontaneously cooled to obtain primary sintered bodies of Sample Nos. 1 to 3. Properties of the primary sintered bodies obtained are shown in Table 1. The compositions of those primary sintered bodies were the same as the compositions of the raw material powders. Furthermore, those primary sintered bodies had a relative density of 95% or more and an average grain size of 5 μm or less.

TABLE 1

| Sample No. | Cerium oxide mol % | Density of primary sintered body (Relative density; %) | Average grain size μm |
|---|---|---|---|
| 1 | 0.5 | 5.95 (99.5) | 1.1 |
| 2 | 0.75 | 5.96 (99.5) | 1.0 |
| 3 | 1.0 | 5.95 (99.4) | 1.2 |

HIP Treatment and Annealing

The primary sintered bodies of Sample Nos. 1 to 3 were subjected to HIP treatment at a temperature of 1,650° C. under a pressure of 150 MPa for a holding time of 1 hour. Argon gas having purity of 99.9% was used as a pressure medium. HIP apparatus was an apparatus equipped with a carbon heater and a carbon heat-insulating material. Alumina-made crucible with a lid, having gas holes was used as a container in which a sample is placed.

The zirconia sintered body obtained by the HIP treatment showed blackish red color semi-transparency. The zirconia sintered body was further heated in a temperature rising rate of 250° C./h in the air, held at 1,000° C. for 1 hour, and then annealed. The sintered bodies after the annealing treatment all had red color transparency. Properties of the zirconia sintered bodies obtained are shown in Table 2.

TABLE 2

| Example | Sample No. | Transmission at 600 nm (%) | | Maximum in-line transmission (%) (Maximum total forward transmission (%)) | | Brightness | Hue | | Density of sintered body | Average grain size |
|---|---|---|---|---|---|---|---|---|---|---|
| | | In-line transmission | Total forward transmission | 400-500 nm | 600-800 nm | L* | a* | b* | g/cm³ | μm |
| 1 | 1 | 54 | 62 | 0 (0) | 65 (70) | 40.6 | 53.0 | 68.4 | 5.98 | 45 |
| 2 | 2 | 50 | 55 | 0 (0) | 63 (68) | 37.2 | 55.5 | 59.6 | 5.98 | 42 |
| 3 | 3 | 44 | 49 | 0 (0) | 60 (65) | 34.0 | 57.4 | 57.3 | 5.99 | 48 |

Figure 1:
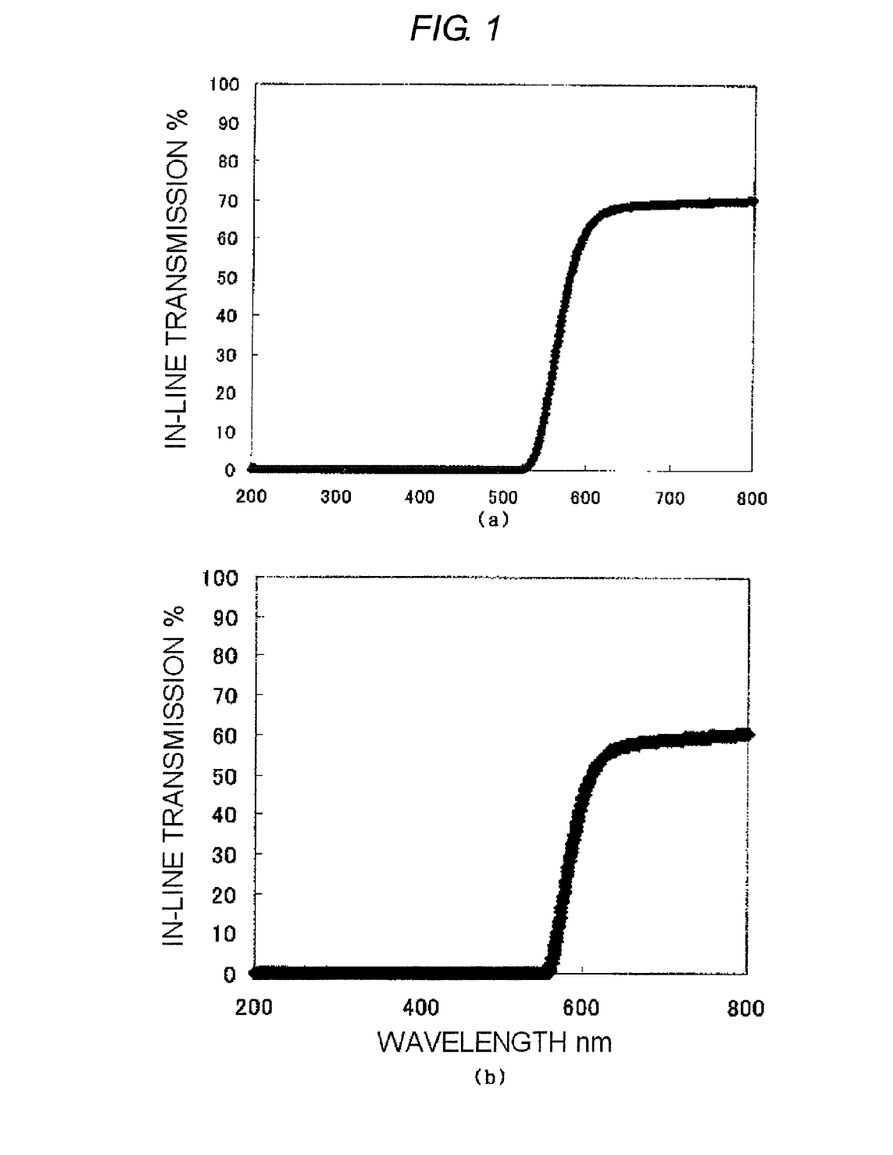
FIG. 1's are graphs showing in-line transmissions ((a): Example 1, (b): Example 3) of the zirconia sintered bodies of the present invention to light having a wavelength of 200 to 800 nm.
Figure 2:
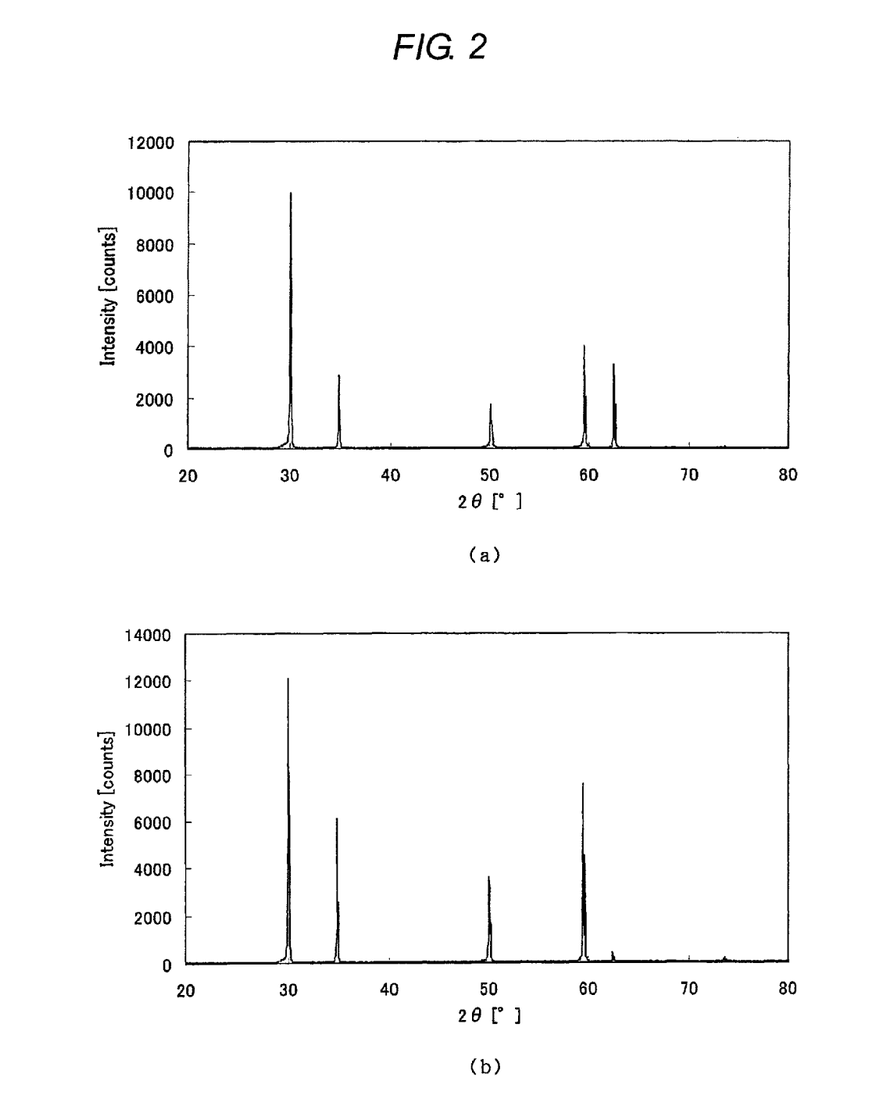
FIG. 2's are graphs showing X-ray diffraction patterns ((a): Example 1, (b): Example 3) of the zirconia sintered bodies of the present invention.

The zirconia sintered body obtained was that light having a wavelength of 500 nm or less does not transmit due to absorption based on red color, and therefore the in-line transmission at 500 to 400 nm was 0%. Furthermore, the crystal structure of all the zirconia sintered bodies was a cubic fluorite type structure. In-line transmissions of Examples 1 and 3 are shown in FIG. 1, and XRD's thereof are shown in FIG. 2.

Examples 4 to 6

Zirconia sintered bodies were obtained in the same manner as in Examples 1 to 3, except for using primary sintered bodies of Sample Nos. 1 to 3 and changing the HIP treatment temperature to 1,500° C. Properties of the zirconia sintered bodies obtained are shown in Table 3.

The zirconia sintered bodies obtained were transparent sintered bodies having low brightness and deep red color, as compared with the zirconia sintered bodies of Examples 1 to 3. Furthermore, crystal phase of all the sintered bodies was a cubic fluorite type structure.

TABLE 3

| Example | Sample No. | Transmission at 600 nm (%) | | Maximum in-line transmission (%) (Maximum total forward transmission (%)) | | Brightness | Hue | | Density of sintered body | Average grain size |
|---|---|---|---|---|---|---|---|---|---|---|
| | | In-line transmission | Total forward transmission | 400-500 nm | 600-800 nm | L* | a* | b* | g/cm³ | μm |
| 4 | 1 | 35 | 40 | 0 (0) | 48 (53) | 29.3 | 45.7 | 50.3 | 5.98 | 14 |
| 5 | 2 | 32 | 37 | 0 (0) | 46 (52) | 26.7 | 45.9 | 45.1 | 5.98 | 15 |
| 6 | 3 | 29 | 34 | 0 (0) | 43 (49) | 22.8 | 46.1 | 39.0 | 5.99 | 15 |

Examples 7 and 8

Preparation of Powder

Zirconia powder, cerium oxide powder, neodymium oxide and cobalt oxide were weighed in given amounts, respectively, and were mixed with a ball mill using zirconia-made balls having a diameter of 10 mm in an ethanol solvent for 72 hours, followed by drying. The dried powder was used as a raw material powder.

Primary Sintering

The raw material powder was molded with metallic mold pressing under a pressure of 50 MPa. The resulting molding was treated with a cold isostatic press apparatus under a pressure of 200 MPa to obtain a columnar molding having a diameter of 20 mm and a thickness of 3 mm.

The moldings were subjected to primary sintering at a sintering temperature of 1,325° C. for a sintering time of 2 hours in the air in a temperature rising rate of 100° C./h to obtain primary sintered bodies of Sample Nos. 7 and 8. The composition of the primary sintered bodies was the same as the composition of the raw material powders.

Properties of the primary sintered bodies obtained are shown in Table 4.

TABLE 4

| Sample No. | Cerium oxide mol % | Neodymium oxide mol % | Cobalt oxide mol % | Density of primary sintered body (Relative density; %) | Average grain size μm |
|---|---|---|---|---|---|
| 7 | 0.5 | 1.0 | — | 5.85 (97.5) | 0.8 |
| 8 | 0.75 | — | 0.05 | 5.83 (97.5) | 0.9 |

HIP Treatment and Annealing

The primary sintered body of Sample No. 7 or 8 was subjected to HIP treatment in the same manner as in Examples 1 to 3 at a temperature of 1,650° C. under a pressure of 150 MPa for a holding time of 1 hour, and the sintered body was then held in the air at 1,000° C. in a temperature rising rate of 250° C./h for 1 hour to perform annealing treatment.

Properties of the zirconia sintered body obtained are shown in Table 5.

TABLE 5

| Example | Sample No. | Transmission at 600 nm (%) | | Maximum in-line transmission (%) (Maximum total forward transmission (%)) | | Brightness L* | Hue | | Density of sintered body g/cm³ | Average grain size μm |
|---|---|---|---|---|---|---|---|---|---|---|
| | | In-line transmission | Total forward transmission | 400-500 nm | 600-800 nm | | a* | b* | | |
| 7 | 7 | 50 | 55 | 0 (0) | 63 (68) | 40.9 | 55.5 | 68.6 | 6.00 | 38 |
| 8 | 8 | 50 | 55 | 0 (0) | 55 (60) | 27.5 | 49.0 | 47.0 | 5.99 | 42 |

It was seen that red tinge is further increased by containing neodymium oxide or cobalt oxide. Furthermore, crystal phase of those sintered bodies was a cubic fluorite type structure.

Example 9

Figure 3:
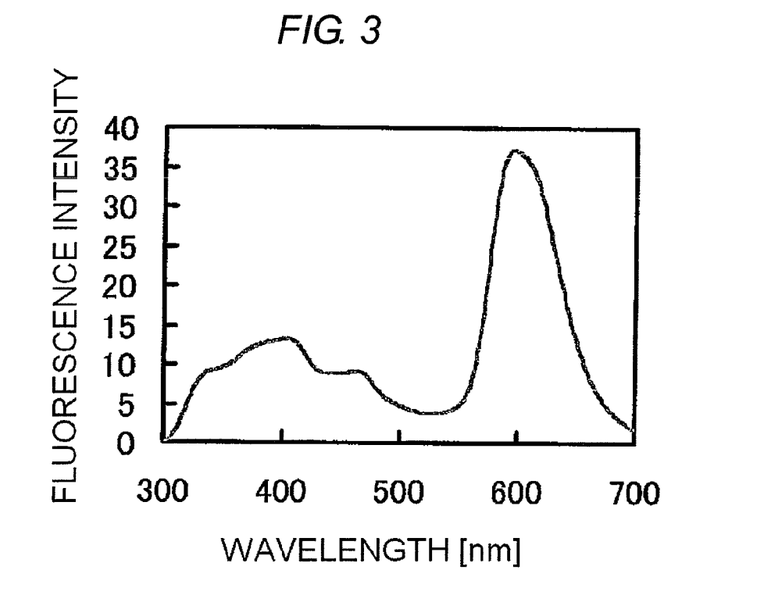
FIG. 3 is a graph showing florescence spectrum of Example 3.

Fluorescence spectra of the zirconia sintered bodies of Examples 3 and 6 were measured. Emission of light having a peak at 590 nm attributable to trivalent cerium was observed in those zirconia sintered bodies, and the presence of trivalent cerium was confirmed. The fluorescence spectrum of Example 3 is shown in FIG. 3.

The zirconia sintered bodies of Examples 3 and 6 each decreased their weights in an amount of 0.06% by weight before and after the HIP treatment. This weight loss corresponded to the weight loss (0.06% by weight) calculated from reduction of cerium oxide shown in the formula (1) above ($CeO_2 \rightarrow \frac{1}{2}Ce_2O_3 + \frac{1}{4}O_2$). As a result of calculating the proportion of trivalent cerium (proportion of an oxide of trivalent cerium) to cerium oxide contained in the zirconia sintered body from the formulation of $CeO_{1.5}/(CeO_{1.5}+CeO_2)$, the proportion is 100 mol % in the zirconia sintered bodies of Examples 3 and 6.

Weight loss before and after the HIP treatment was not confirmed in the zirconia sintered body free of cerium. It therefore says that the weight loss is due to the reduction of cerium.

Comparative Examples 1 and 2

Zirconia sintered bodies obtained in the same manners as in Examples 3 and 6 were subjected to annealing treatment by holding at a temperature of 1,200° C. for 1 hour in the air in a temperature rising rate of 250° C./h. Those zirconia sintered bodies were transparent bodies having slightly pale yellowish tinge.

Figure 4:
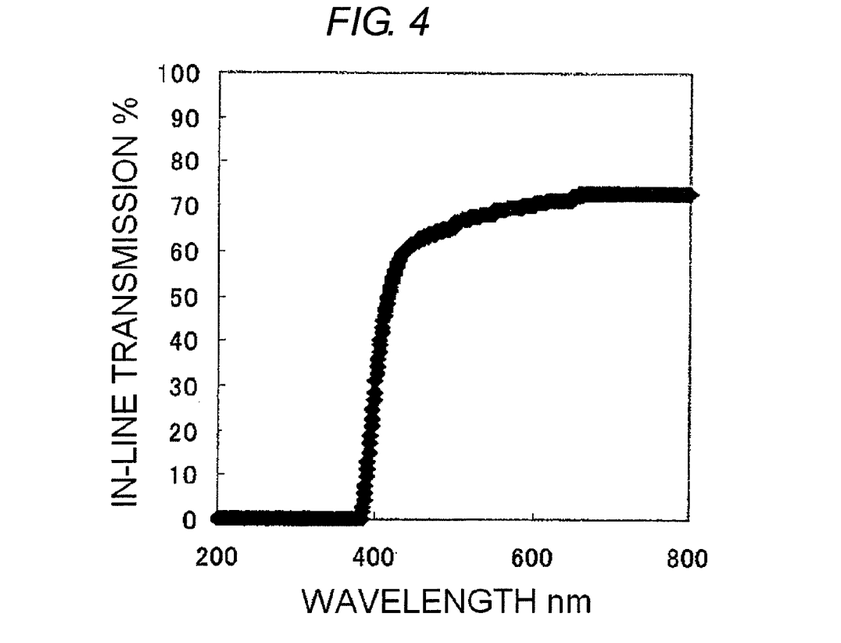
FIG. 4 is a graph showing in-line transmission of Comparative Example 1 to light having a wavelength of 200 to 800 nm.

Properties of the zirconia sintered bodies are shown in Table 6, and in-line transmission of Comparative Example 1 is shown in FIG. 4.

The fluorescence spectrum of Comparative Example 1 has a main peak near 400 nm, and a peak near 590 nm was not observed. It was seen from this fact that the zirconia sintered body of Comparative Example 1 does not contain trivalent cerium.

TABLE 6

| Comparative Example | Transmission at 600 nm (%) | | Maximum in-line transmission (%) (Maximum total forward transmission (%)) | | Brightness L* | Hue | | Density of sintered body g/cm³ | Average grain size μm |
|---|---|---|---|---|---|---|---|---|---|
| | In-line transmission | Total forward transmission | 400-500 nm | 600-800 nm | | a* | b* | | |
| 1 | 68 | 70 | 65 (67) | 73 (75) | 83 | 1.6 | 11.0 | 6.00 | 48 |
| 2 | 66 | 68 | 63 (65) | 68 (70) | 81 | 1.5 | 11.5 | 5.99 | 15 |

Although the present invention has been described in detail and by reference to the specific embodiments, it is apparent to one skilled in the art that various modifications or changes can be made without departing the spirit and scope of the present invention.

This application is based on Japanese Patent Application filed Mar. 9, 2010 (Application No. 2010-051627), the disclosure of which is incorporated herein by reference.

INDUSTRIAL APPLICABILITY

The zirconia sintered body of the present invention has, in addition to diamond luster based on high refractive index inherent in zirconia, deep red color and transparency. In addition to this, the zirconia sintered body has high hardness. Therefore, the zirconia sintered body can be utilized to various members such as scratch-resistant luxurious jewelry goods, jewelry members such as watch components, and exterior component of portable electronic equipment. Accordingly, industrial value of the present invention is remarkable.

The invention claimed is:

1. A zirconia sintered body comprising 6 to 30 mol % of yttria, and 0.1 to 5 mol % of cerium oxide in terms of $CeO_2$, the cerium oxide containing an oxide of trivalent cerium;
    wherein, in a sample of the zirconia sintered body having a thickness of 1 mm, a maximum value of inline transmission to visible light having a wavelength of 600 to 800 nm is 40% or more, and an average grain size of crystal particles is 10 μm or more and 50 μm or less.

2. The zirconia sintered body according to claim 1, wherein a crystal phase is a cubic fluorite structure.

3. The zirconia sintered body according to claim 2, wherein in a sample having a thickness of 1 mm, a maximum value of in-line transmission to visible light having a wavelength of 400 to 500 nm is 3% or less, and a maximum value of in-line transmission to visible light having a wavelength of 600 to 800 nm is 40% or more.

4. The zirconia sintered body according to claim 2, wherein brightness L*, and hues a* and b* are 20≤L*≤50, 40≤a*≤60 and 30≤b*≤70.

5. A member comprising the zirconia sintered body according to claim 2.

6. The zirconia sintered body according to claim 1, wherein in a sample having a thickness of 1 mm, a maximum value of in-line transmission to visible light having a wavelength of 400 to 500 nm is 3% or less, and a maximum value of in-line transmission to visible light having a wavelength of 600 to 800 nm is 40% or more.

7. The zirconia sintered body according to claim 1, wherein brightness L*, and hues a* and b* are 20≤L*≤50, 40≤a*≤60 and 30≤b*≤70.

8. A method for producing a zirconia sintered body of claim 1, comprising molding a zirconia powder containing 6 to 30 mol % of yttria and 0.1 to 5 mol % of cerium oxide in terms of $CeO_2$, subjecting the resulting molding to primary sintering, hot isostatic press treatment and annealing, and forming trivalent cerium in the sintered body.

9. The production method according to claim 8, wherein the HIP treatment is conducted by placing the primary sintered body in a gas-permeable container.

10. The method for producing a zirconia sintered body according to claim 9, wherein the annealing is conducted at 800° C. or higher and 1,000° C. or lower.

11. The production method according to claim 9, wherein the primary sintered body to be subjected to the HIP treatment has an average grain size of 5 μm or less.

12. The method for producing a zirconia sintered body according to claim 8, wherein the annealing is conducted at 800° C. or higher and 1,000° C. or lower.

13. The production method according to claim 8, wherein the primary sintered body to be subjected to the HIP treatment has an average grain size of 5 μm or less.

14. A member comprising the zirconia sintered body according to claim 1.

15. Jewelry goods comprising the member according to claim 14.

16. An exterior component comprising the member according to claim 14.

* * * * *